Patented Apr. 9, 1940

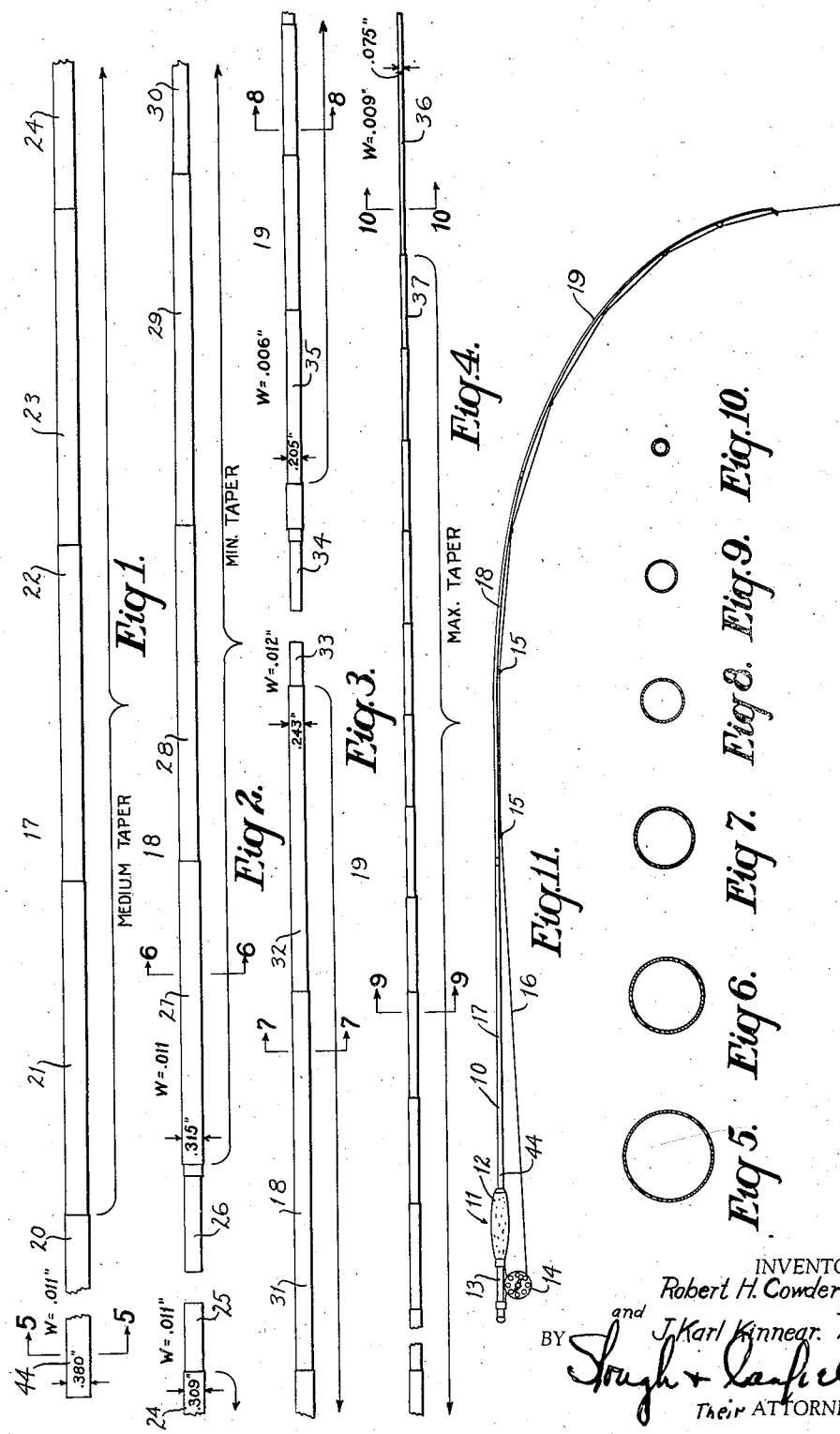

2,196,743

UNITED STATES PATENT OFFICE 2,196,743

JOINTED SEAMLESS FISHING ROD

Robert H. Cowdery and J Karl Kinnear, Geneva, Ohio, assignors to The American Fork & Hoe Company, Cleveland, Ohio, a corporation of Ohio Application August 7, 1934, Serial No. 738,830

14 Claims. (Cl. 43—18)

My invention relates to tubular metallic fishing rods and relates more particularly to tubular metallic fishing rods preferably of drawn seamless steel or similar highly resilient metal, being so designed as to distribute the mechanical properties of different portions of the rod as to weight, strength and resiliency in such manner as to accomplish a highly effective operative result without liability to breakage, particularly in the parts which are most liable to break during use of the rod.

Heretofore, fishing rods, particularly of the long sectional types used for fly rod fishing, have been ordinarily made of bamboo or like light material, although efforts have been made to make such rods of tubular steel construction, but in such latter cases, the rods have been unduly heavy, the weight has been inefficiently distributed, or whenever the rods are made lighter they are insufficiently strong. Bamboo rods on the other hand, though of the desired lightness are subject to considerable variation in the desired properties of strength and resiliency, are expensive to manufacture and leave something to be desired as in the degree of efficiency secured in use.

The present invention is primarily directed to rods of the sectional fly rod type wherein lightness, extreme flexibility in certain portions of the rod, coupled with the desired strength in all portions of the rod and a peculiar relationship of weight, flexibility and strength is desired in the different portions of the rod.

It is an object of our invention therefore to provide a metallic seamless rod of the type referred to having the desired strength, flexibility and weight in different portions of its length which together is commonly referred to as the proper balance.

Another object of our invention is to provide a metallic seamless fishing rod comparable to the very finest bamboo fly rods in lightness, flexibility and weight, but which will be superior thereto in that the rod of our invention may be manufactured less expensively, will be of more uniform quality, and is stronger and more durable.

Other objects of the invention and the invention itself will become increasingly apparent from a consideration of the following description and drawing, wherein:

Figs. 1 to 4 inclusive are fragmentary views of interengageable sections, forming the rod of our invention;

Figs. 5 to 10 inclusive are transverse sectional views, taken along the lines 5—5, 6—6, 8—8, 9—9, 10—10 of Figs. 1 to 4 inclusive;

Fig. 11 is an elevational view of a rod embodying our invention, showing generally the position the rod assumes when in use.

Referring now to the drawing, in Fig. 11 I have shown a rod 10 composed of separate joined sections 17, 18, and 19, in assembled relationship, the section 17 being detachably seamed to a rod handle 11 provided with the usual reel support 13 for a reel 14, the handle comprising a socket portion 12 within which the plug butt end 44 of the rod section 17 is secured, thus detachably securing the handle 11 to the rod in the usual manner.

Guides 15 are provided at spaced points along rod 10 for a line 16, the guides being secured to the rod in any well known manner.

Each of the sections 17, 18, and 19 are of substantially tapered tubular formation and seamless throughout. The tapering of the sections is effected by the provision of a large number of successive cylindrical step portions which are of successively decreased external diameter, and of variable wall thickness in different portions of the rod, as will later appear. The step portions of the three sections preferably progressively vary in length proceeding toward the terminal portion at the tip end of the rod, whereby the rate of external taper and relative wall thickness at various portions of the rod will be variable to control the curvature and flexibility of the rod when in use. While I effect the tapering by a stepped formation, it will be understood that a continuous or more gradual change in diameters is the full equivalent thereof.

The innermost rod section 17 initiating with a butt portion 20 which is telescoped within the handle portion 12 of handle 11 includes portions 21, 22, 23, and 24. The butt portion 20 may have a length such as 11" and an external diameter of .380", the succeeding portions 21, 22, 23, and 24 preferably being of a substantially constant length such as 5½" and successive groups of stepped portions being progressively reduced in external diameter terminating in an external diameter at portion 24 of .309". The wall thickness of section 17 is preferably substantially constant, that of the illustrated embodiment being .011". The rate of taper of section 17 averages about .038" per foot.

Adjacent the step portion 24 is a reduced relatively short portion 25 forming a socket end for the first rod section 17, and adapted to be telescoped over a relatively short cooperating plug end portion 26 of the intermediate rod section 18, the internal diameter of portion 25 and the external diameter of portion 26 being such that sections 17 and 18 may be thereby frictionally maintained in desired assembled relation. The intermediate rod section 18 comprises successive step portions indicated at 27, 28, 29, 30, 31, and 32, of successively decreasing external diameter and preferably increasing in wall thickness at successively increasing distances from the end of the rod section of greatest diameter. The step portion 27 may have an external diameter or .315" and a wall thickness of .011" and the relatively remote step portion 32 may have an external diameter of .243" and a wall thickness of .011" to .0125", the steps disposed approximately centrally of the rod section 18 being preferably of greater lengths, such as 6" per step, and the lengths of steps at either end of the section being preferably reduced, such as to 5" per step. The rate of taper of section 18 averages about .030" per foot.

Integral with the outermost step 32 of rod section 18 is a relatively short terminal portion 33 adapted to be telescoped over a cooperating short portion 34 of the outermost rod section 19, whereby rod sections 18 and 19 may be detachably secured together as previously described. The outermost or rod tip section 19 comprises steps such as the innermost step 35, the tip step 36, and its adjacent joint portion 37, the step lengths generally decreasing in external diameter and in length as the tip end of the rod is approached, step 35 having a length such as 2¹³⁄₁₆" and step 37 a length such as 1½". The tip portion 36 is preferably somewhat longer having a length such as 4". The external diameter of portion 35 is .205" with a wall thickness of .006", the external diameter of the portions successively decreasing to an external diameter at the tip portion of .075" and a wall thickness at the tip portion of .009". The taper of rod section 19 averages .047" per foot and it will be noted that the wall thickness although increasing as the tip end of the rod section is approached, is less than the wall thickness of rod sections 17 and 18.

The separable rod sections 17, 18 and 19 thus form a relatively long jointed tubular fly rod of step tapered construction, wherein the steps are successively decreased in external diameter from the butt end of the rod to the tip end, the rod section 17 including the butt portion being provided with a medium rate of external taper, the central rod section 18 being provided with a minimum rate of external taper and the outermost rod section 19 being provided with a maximum rate of external taper. Rod sections 17 and 18, largely due to their greater diameters, are relatively more stiff than the tip section 19 which has a greater rate of external taper and lesser wall thickness, the relative flexibility of the tip section being roughly indicated by Fig. 11. The successive decrease in external diameter at successively increasing distances from the butt end of the rod and the relative wall thickness at these points is clearly illustrated in Figs. 5 to 10 inclusive. Although the tip section is relatively flexible considerable resistance is offered to any tendency toward buckling inwardly under pressure due to the relatively small bore, increased wall thickness, and resultant proximity of the inner wall surfaces thereby providing a relatively strong tip section.

Having described particularly the make up of the rod of our invention as embodied in the particular rod illustrated herein, it is to be noted that the rod is characterized by the provision of three portions which may be roughly designated as the portion including the butt which is of largest diameter, an intermediate portion which is of intermediate diameter, and a tip portion which is of least diameter, and in the embodiment illustrated these three portions are generally represented by separate sections being the sections 17, 18 and 19, although the rod of our invention in its broader aspects may not be made sectional.

Each of the sections is preferably tapered throughout and we find that the best results are secured by so making the first two sections that they are tapered at a very moderate rate and then so forming the last section that its rate of taper is considerable greater than that of the first two sections. We preferably also, although this is of less importance, make the first section 17 of a slightly greater rate of taper than the intermediate section, but the tip section for reasons which will be apparent to a skilled fly fisherman has the greatest rate of taper. At the same time, the rate of taper of the different portions or sections of our improved rod is different on the external surface of the rod than on the interior surfaces of the rod bore, this resulting in a difference in wall thickness in different portions of the rod length.

In the embodiment of our invention illustrated therefore, the walls of the rod are progressively slightly increased in thickness in the first two sections of the rod, being, however, substantially uniform in wall thickness in the first section, the second section having a slightly increased wall thickness at its end of smaller diameter over than at its end of larger diameter. The third or tip section 19, however, has its wall thickness materially increased as the tip is approached, the difference in thickness in the embodiment illustrated representing a 25% increase in wall thickness from the end of the tip section of largest diameter to the end of smallest diameter.

From the above it is apparent that, the first section being increased in wall thickness from its larger end to its smaller end, at a rate which is less than the rate of increase of wall thickness in the second section, and the rate of increase of wall thickness from the larger end to the smaller end of the third section being greater than the rate prevailing in the second section, we have provided a plurality of successive sections of varying wall thicknesses, and that the ratio of variation as determined by the wall thickness at the two ends of each section is different in each of the plurality of said sections from that of the preceding and succeeding sections.

As previously stated the tapering of the rod and the progressive changes in wall thickness is effected for the purpose of distributing the weight, resiliency and strength of the rod for best results when fishing, it being understood that the tip of the rod must yield to produce the snap action throw of the line when fishing and must also yield quite readily when a fish has taken the hook at the end of the line. At the same time the entire rod particularly the tip thereof must be of very light weight and the distribution of weight must be such that in casting the flow of casting effort must proceed from the butt end to the tip end of the rod progressively and without any nodal vibrations of the rod during the cast. This is effected in the rod of our invention by the distribution of weight, flexibility and the relationship of the different portions as to tapering or in any other suitable manner, the provision of the successive steps, such as 21, 22 and 23, etc. being but one way of achieving a progressive reduction in diameter, which may be alternatively effected in other embodiments of the invention by a more gradual change in diameter without the provision of any of such steps, or the rod may in different portions be tapered gradually with stepped sections provided in other portions as desired. Where the rod is made of steels such steel will be tempered in any well known manner which will retain therein the properties of strength and resiliency to the desired degree.

The rod sections may be formed in any desired manner preferably by tube drawing operations, such as outlined in a patent to Robert H. Cowdery for a Method of drawing tubes, issued June 12, 1934; No. 1,963,048.

Although we have shown and described a preferred embodiment of our invention we contemplate that numerous and extensive departures may be made therefrom without departing from the spirit of our invention and scope of the appended claims. Reference may also be had to our co-pending application, Serial No. 738,102, filed August 2, 1934, for "Improvements in seamless fishing rods."

Having thus described our invention what we claim is:

1. A fishing rod made of tubular metallic separable sections, a plurality of which are exteriorly tapered and wherein the degree of taper of said tapered sections differs in the different sections.

2. A fishing rod made of tubular metallic separable sections, at least one of which is exteriorly tapered, and in which the degree of taper differs within different portions of the same section.

3. A fishing rod made of tubular metallic separable sections, a plurality of which are exteriorly tapered and wherein the degree of taper of said sections differs in the different sections, and wherein the wall thickness of the tapered sections is progressively increased proceeding from the end of larger diameter toward the end of smaller diameter.

4. A fishing rod made of tubular metallic separable sections, a plurality of which are exteriorly tapered and wherein a plurality of the sections are of varying wall thickness, the ratio of variation in wall thickness being different in each of the plurality of said sections.

5. A fishing rod made of tubular metallic separable sections, at least one of which is of varying wall thickness, and in which the ratio of variation in wall thickness differs in different portions of the same section.

6. A fishing rod made of tubular metallic separable sections, a plurality of which are exteriorly tapered and wherein the degree of taper of said tapered sections differs in different sections at least one of which sections has walls constantly reduced in thickness.

7. A fishing rod made of tubular metallic separable sections, each of said sections tapering generally from the section end adjacent the rod butt towards the section end more remote from the rod butt, and the degree of taper of each section being different.

8. A fishing rod made of tubular metallic separable sections, a plurality of which have walls of varying thickness, and wherein the ratio of variation in wall thickness of each said section is different.

9. A fishing rod made of tubular metallic separable sections, a plurality of which are exteriorly tapered and wherein the degree of taper of each said section is different, at least one of said sections having walls of constant thickness.

10. A fishing rod made of tubular metallic sections, a plurality of which are exteriorly tapered, the average degree of taper of each of said sections being different, and portions of each section varying in relative taper.

11. A tubular exteriorly tapered continuous-walled metallic fishing rod characterized by the fact that different portions of the rod are progressively varied in wall thickness by differing ratios from the butt end toward the tip end, and in which different portions of the rod exteriorly taper in conformity with varying ratios.

12. A tubular exteriorly tapered metallic fishing rod characterized by the fact that the bore of the rod is tapered from the butt toward the tip in different degree than the exterior with a resulting progressive variation in wall thickness toward the tip region.

13. A tubular metallic fishing rod of seamless construction throughout being exteriorly tapered from butt to tip and characterized by the fact that the ratio of exterior tapering is progressively increased in the rod portion nearest the tip end of the rod proceeding in the direction of the rod tip.

14. A tubular exteriorly tapered continuous-walled metallic fishing rod characterized by the fact that different portions of the rod are progressively increased in wall thickness by differing ratios from the butt end toward the tip end, and in which different portions of the rod exteriorly taper in conformity with varying ratios.

ROBERT H. COWDERY.
J KARL KINNEAR.